(12) United States Patent
Bird et al.

(10) Patent No.: US 10,042,740 B2
(45) Date of Patent: Aug. 7, 2018

(54) TECHNIQUES TO IDENTIFY IDIOMATIC CODE IN A CODE BASE

(71) Applicant: MICROSOFT TECHNOLOGY LICENSING, LLC, Redmond, WA (US)

(72) Inventors: Christian Alma Bird, Redmond, WA (US); Mark Marron, Redmond, WA (US); Miltiadis Allamanis, Edinburgh (GB); Earl Theodore Barr, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/960,114

(22) Filed: Dec. 4, 2015

(65) Prior Publication Data
US 2017/0161177 A1   Jun. 8, 2017

(51) Int. Cl.
G06F 9/44    (2018.01)
G06F 11/36   (2006.01)
G06F 8/30    (2018.01)
G06F 8/36    (2018.01)
G06F 8/51    (2018.01)
G06F 8/72    (2018.01)

(52) U.S. Cl.
CPC ............ *G06F 11/3672* (2013.01); *G06F 8/30* (2013.01); *G06F 8/36* (2013.01); *G06F 8/51* (2013.01); *G06F 8/72* (2013.01)

(58) Field of Classification Search
None
See application file for complete search history.

(56) References Cited

U.S. PATENT DOCUMENTS

2010/0042976 A1   2/2010  Hines
2014/0173559 A1*  6/2014  Tiwari .................... G06F 8/31
                                              717/122

FOREIGN PATENT DOCUMENTS

GB         2420638 A      5/2006

OTHER PUBLICATIONS

"International Search Report and Written Opinion Issued in PCT Application No. PCT/US2016/063742", dated Feb. 24, 2017, 12 Pages.
Alias, et al., "Deciding Where to Call Performance Libraries", In 11th International Euro-Par Conference on Parallel Processing, Aug. 30, 2005, pp. 336-345.
Allamanis, et al., "Mining Idioms from Source Code", In Proceedings of the 22nd ACM SIGSOFT International Symposium on Foundations of Software Engineering, Nov. 16, 2014, pp. 472-483.

* cited by examiner

*Primary Examiner* — Qamrun Nahar

(57) ABSTRACT

Techniques to identify idiomatic code in a code base are described. Embodiments of such techniques are configured with idiom information corresponding to idiomatic code representations of computer code of which each idiomatic code representation comprises information corresponding to a control structure and variable usage. These techniques are operative to compare the idiomatic code representations to computer code fragments in the code base and identify one or more code fragments matching at least one of the idiomatic code representations. These techniques may identify functional operators for replacing the code fragments in the code base. Other embodiments are described and claimed.

20 Claims, 14 Drawing Sheets

*800*

```
IDENTIFY ONE OR MORE PROGRAMMING CONSTRUCTS
BASED ON A CONTROL STRUCTURE
802
```

```
GENERATE A SYNTACTIC ABSTRACTION TO ASSOCIATE
SEMANTIC INFORMATION WITH PORTIONS OF THE
CONTROL STRUCTURE
804
```

```
DETERMINE THAT THE SYNTACTIC ABSTRACTION
CORRESPONDS TO AN IDIOM USING PROBABILISTIC
GRAMMARS
806
```

```
SELECT THE IDIOM BASED ON COVERAGE AND
INFORMATION CONTENT AMONGST A SET OF IDIOMS
808
```

```
PARTITION A PLURALITY OF PROGRAMMING CONSTRUCTS
INTO A SETS OF PROGRAMMING CONSTRUCTS
902
          ↓
GENERATE A SYNTACTIC ABSTRACTION TO INCLUDE
SEMANTIC FEATURES OF A CONTROL STRUCTURE SYNTAX
FOR EACH SET OF PROGRAMMING CONSTRUCTS
904
          ↓
RANK THE SYNTACTIC ABSTRACTIONS
906
          ↓
SELECT AN SYNTACTIC ABSTRACTION AS AN IDIOM IN A SET
OF IDIOMS
908
          ↓
    COVERED SET? 910
          ↓
GENERATE RULES FOR REWRITING COMPUTER CODE
912
```

MODIFY AN ABSTRACT SYNTAX TREE OF A LOOP CONSTRUCT
*1002*

STORE INFORMATION CORRESPONDING TO PURITY AND/OR USAGE PATTERNS
*1004*

DETERMINE THAT THE MODIFIED SYNTAX TREE CORRESPONDS TO AN IDIOM USING PROBABILISTIC GRAMMARS
*1006*

GENERATE INFORMATION CORRESPONDING TO MODIFYING THE LOOP CONSTRUCT
*1008*

REPLACE AN IDIOM IN A CODE BASE WITH A FUNCTIONAL OPERATOR
*1202*

IDENTIFY A NEW OPERATOR TO IMPLEMENT FOR AN EXTENDED LIBRARY
*1204*

GENERATE CODE FOR A NEW METHOD TO ADD TO THE CODE BASE
*1206*

CONVERT AN INTERMEDIATE EXPRESSION TO AN OBJECT FOR USE IN ANOTHER EXPRESSION IN A FUNCTION
*1208*

TECHNIQUES TO IDENTIFY IDIOMATIC CODE IN A CODE BASE

BACKGROUND

Computer code in a code base, when executed by a computing system, performs various operations that control instrumentalities of the computing system. To illustrate by way of example, an application program uses a storage device of the computing system to retrieve data, a processing component to modify the retrieved data, and a networking mechanism to communicate the modified data to a destination computer. The computer code in the code base includes examples of idiomatic code configured to perform common operations for a particular language. These examples exhibit peculiarities and other differences often attributable to a developer or a production environment. Executing these examples often result in inefficiencies.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to identify idiomatic code in a code base. Some embodiments are particularly directed to techniques to refactor a programming construct having the idiomatic code for the purpose of improving the code base's performance and efficiency when that code base is executed. In one embodiment, for example, an apparatus may comprise a logic circuit and logic operative on the logic circuit to identify programming constructs based on a control structure, generate information to represent the programming constructs, the information comprising a syntactic abstraction to associate semantic information with portions of the control structure, and select the syntactic abstraction as an idiom based on coverage and information content amongst a set of idioms.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the system of FIG. 1.

FIG. 9 illustrates an embodiment of a logic flow for the mining component of FIG. 2.

FIG. 10 illustrates an embodiment of a logic flow for the suggestion engine of FIG. 3.

FIG. 12 illustrates an embodiment of a logic flow for the distributed system of FIG. 7.

DETAILED DESCRIPTION

Figure 1:
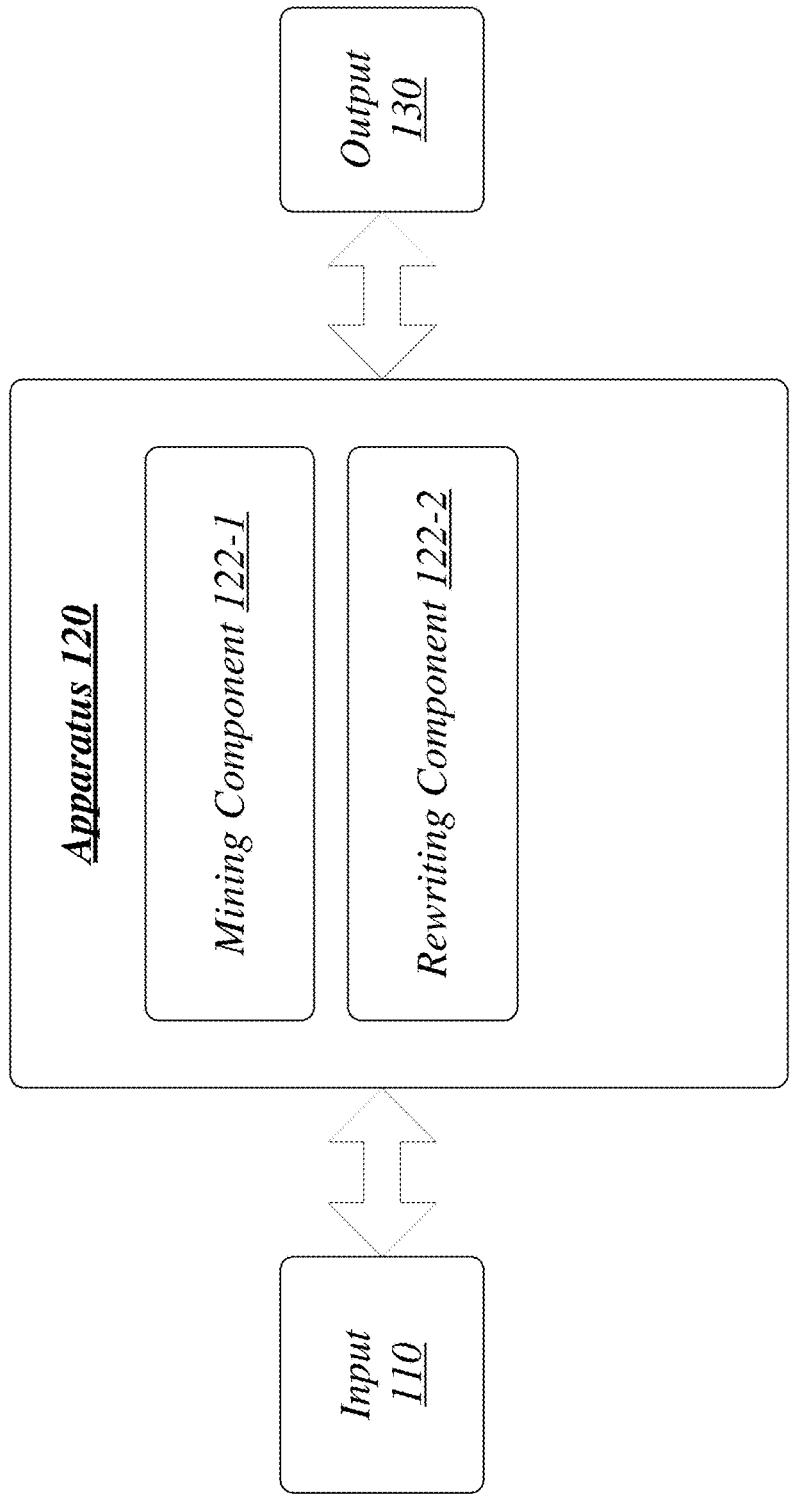
FIG. 1 illustrates an embodiment of a system to identify idiomatic code in a code base.

Various embodiments are directed to techniques to identify idiomatic code in a code base. Some embodiments use the idiomatic code to improve the operation of the code base or another code base. One example embodiment may mine a code corpus comprising code fragments to identify the idiomatic code. The idiomatic code may be represented in a form that captures universal properties of a corresponding control structure syntax and associates portions of the control structure syntax with corresponding semantic information. Representing the idiomatic code in this form enables identification of a substantial number of programming constructs that semantically similar. Some of these programming constructs may match the corresponding control structure syntax or match a generic structural pattern for that syntax. Hence, one of these programming constructs may be syntactically different but still adhere to the generic structural pattern.

Performance of the above techniques may be further enhanced by processing the code base and automatically identifying which programming constructs to target for potential rewriting. This allows for the identification of new rewriting rules, such as rules for refactoring loop idioms into functional form. One example embodiment may generate a rewriting rule to transform the code base into a more efficient code base where the idiomatic code is replaced or mitigated. One example embodiment may identify an operator and/or other computer code to replace the idiomatic code. For instance, a functional call to the operator may be inserted in place of the idiomatic code. The operator may be known and implemented in a native programming language of the code base. The operator may be part of the native programming language or in an extended library to the programming language.

As described in detail herein, example embodiments may utilize the techniques described herein to identify idioms for any type of programming construct, such as conditional constructs, loop constructs, exception handling constructs, and/or the like. Example loop constructs include a for loop, a while loop, or any other loop construct in a programming language's interface. An example exception handling construct include a try catch block. As described herein, the programming construct, when executed by a processor, may cause inefficient or error-prone computer operation such as memory mismanagement, runtime errors, execution faults, resource overconsumption and/or the like. Mitigating or resolving altogether these inefficiencies or errors is desired.

To this end, the various embodiments include techniques to generate rewriting rules to build a refactoring component or tool operative to modify a code base to include more efficient computer code to enhance that code base's operation. As described herein, these rules may define code refactorings for a covered set of idioms such that a substantial number of code fragments are transformable and optimizable. Each idiom, therefore, covers a variety of structurally diverse computer code. For at least this reason, two or more code fragments may map to one idiom and be structurally different in terms of syntax.

Common idioms may be generalized into one abstraction using syntactic rules that tend to group together via statistical inference. These rules may group together contiguously and form a more informative syntactic structure. Accordingly, the various embodiments use this abstraction to generate computer code (e.g., a function) to insert at each instance of the grouped rules. Some example embodiments described herein enable a high-precision refactoring tool to identify a limited number of loop idioms to cover a substantial portion (e.g., a majority) of loop constructs in a considerably sized corpus and to rewrite the constructs as functions with substantial accuracy. Some example embodiments may enable a data-driven programming language design where a new function is suggested if a function cannot be deduced for a given loop construct. Such embodiments may extend an application programming interface with an additional methods or classes.

To illustrate by way of example, one example implementation implements refactoring techniques operative to transform constructs into operators, such as C# LINQ constructs. To support this form of refactoring, the example implementation generates C# idioms, each of which is an abstraction that captures general aspects of a C# control flow. Code fragments according to a C# based API, such as a database system API or a computer networking API, may be a source corpus from which the C# idioms are extracted. An example extraction process generalizes expressions, function calls, types, and arguments and other aspects for trivial and non-trivial differences. Some differences affect the control flow while others are non-structural.

Based upon the idioms identified in the corpus of C# code fragments, the example implementation generates suggestions for improving the C# based API with new C# classes, methods, protocols, and/or other features. The example implementation may improve upon the previous suggestions by extracting idioms from a different corpus, such as a corpus of LINQ expressions in the LINQ API, and identifying one or more new LINQ operators to add to the LINQ API.

With respect to the above database system API example, developers may consistently use a certain loop construct to perform a conditional transfer of records between several databases. The loop construct's control structure may be represented as a control-centric abstract syntax tree that has undergone a process described herein as coiling. In this process, an initial syntax tree is generated and then, modified by generalizing non-structural or other trivial differences between loop constructs. The coiling process stores variable usage patterns and semantic information in nodes of the modified abstract syntax tree. Example semantic information corresponds to the condition transfer code's record transfer task, such as purity information, resource utilization, and/or the like.

It is appreciated that the modified abstract syntax tree may be known as a coiled abstract syntax tree. The refactoring techniques described herein use the coiled abstract syntax tree to identify substantially all instances of the conditional transfer in the database system API. Some example embodiments replace each identified instance with an operator. In some example embodiments, the conditional transfer may be implemented as a new method in the database system API or as an extended library functional operator. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a system 100. In one embodiment, the system 100 may comprise a computer-implemented system 100 having an apparatus 120 comprising one or more components 122-a. Although the system 100 shown in FIG. 1 has a limited number of elements in a certain topology, it may be appreciated that the system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-1, 122-3, 122-4 and 122-5. The embodiments are not limited in this context.

The system 100 may comprise an apparatus 120. The apparatus 120 may be generally arranged to identify idiomatic code in a code base. As described herein, the code base refers to any collection of computer code including software application components and/or an application programming interface (API). The code base may include code fragments in a training corpora for the purpose of mining idioms as described herein. The code fragments may be in the form of processor-executable instructions that pertain to performing various tasks. Instructions from the code base may be input 110 to the apparatus 120; and if those instructions form idiomatic code, the apparatus 120 identifies computer code to replace those instructions. The apparatus 120 may replace the instructions with more efficient computer code, such as a function call to an operator in an extended library to the API. Hence, the code base is modified such that the operator is called instead of executing the instructions, thereby improving the code base's performance.

The apparatus 120 may comprise a logic circuit and logic operative on the logic circuit to identify programming constructs based on a control structure, generate information to represent the programming constructs, the information comprising a syntactic abstraction to associate semantic information with portions of the control structure, and select the syntactic abstraction as an idiom based on coverage and information content amongst a set of idioms.

The logic of the apparatus 120 may comprise a mining component 122-1 that may be generally arranged to perform a mining process on the code base to identify instances of idiomatic code or idioms. It is appreciated that an idiom may be any programming construct having a syntactic (e.g., control) structure that is common in the code base. The programming construct refers to a syntactically allowable control structure of computer code that adheres to rules set forth by an applicable programming language and the API. Any type of programming construct may form an idiom, including iterative loops, conditional statements, recursive loops, and/or the like. Note, two or more programming constructs do not have to be clones of each other to be considered idioms. If these programming constructs are semantically similar, the programming constructs may resolve to the same idiom and still be structurally different in certain aspects of the syntactic structure. Hence, one idiom may cover all these programming constructs.

According to an example mining process, the mining component 122-1 may identify a popular construct (e.g., a loop construct) as an opportunity for refactoring computer code that is structurally similar and frequent enough. The mining component 122-1 may generate an idiom, a representation of idiomatic code in the construct, to identify each instance of such computer code. The mining component 122-1 may identify an operator for the idiom and reuse that operator at each instance of the construct and any similar computer code in the code base. In a corresponding rewriting rule, the idiom appears on a left hand side (LHS) and the appropriate operator appears on a right hand side.

To confirm that the construct includes idiomatic code, the mining component 122-1 forms a syntactic abstraction to represent the construct. The syntactic abstraction includes a representation that abstracts away non-control related portions of the construct's computer code to better represent the control structure of that computer code. Some of these features are not related to the computer code code's semantics and therefore, can be removed. The mining component 122-1 removes extraneous parts such as user code or test code and inserts references to generalize variables and other differences in the idiomatic code representation. Some parts may relate to the computer code's semantics but only to irrelevant variability. The mining component 122-1 employs grammars on the syntactic abstraction to infer a core idiom. The mining component 122-1 may generate information suggesting modifications to the construct such as identifying an appropriate operator to replace the construct. Once the construct's computer code is inferred as an idiom, the syntactic abstraction constitutes an idiomatic code representation, which may be used in the above mentioned rewriting rule for refactoring the construct's computer code.

The logic of the apparatus 120 may comprise a rewriting component 122-2 that may be generally arranged to perform a refactoring process on the code base to rewrite/replace any idiomatic code found in the code base. As an example, the rewriting component 122-2 may identify one or more constructs in a single software program, and modify the single software program replacing each loop construct with an operator if that construct is an idiom. The rewriting component 122-2 accesses idiom information, a set of idiomatic code representations, and compares each construct to each idiomatic code representation until a matching one is identified. Such a comparison, as described herein, may include a comparison of semantic features to determine semantic similarity between the construct and the idiomatic code representations.

Figure 2:
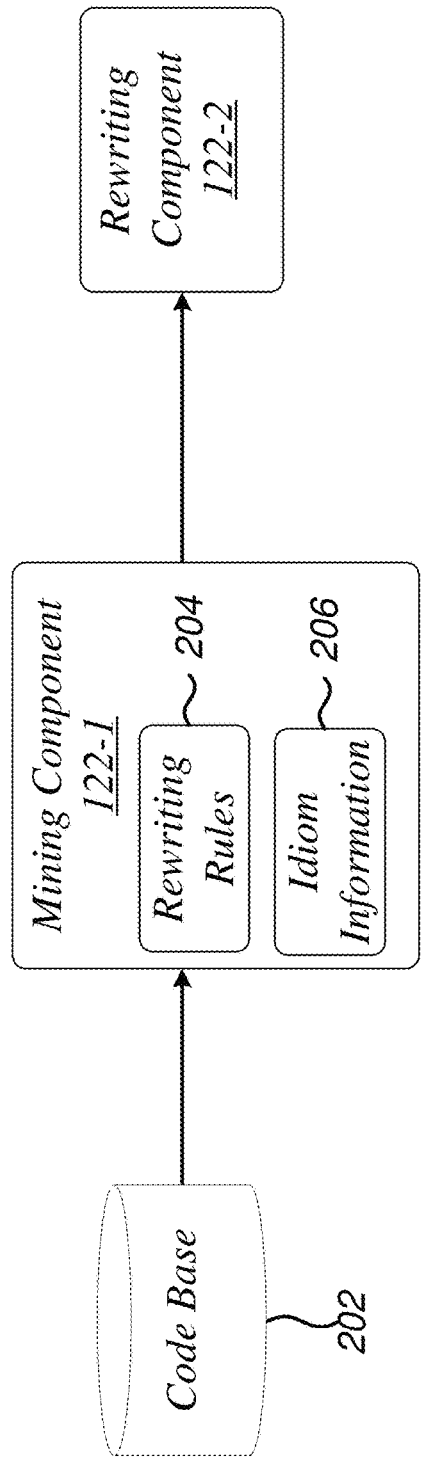
FIG. 2 illustrates an embodiment of a mining component for the system of FIG. 1.

FIG. 2 illustrates an embodiment of an operating environment 200 for the system 100. As shown in FIG. 2, the mining component 122-1 is operative to receive as input a code base 202 and build the rewriting component 122-2. In one example embodiment, the mining component 122-1 is operative to generate rewriting rules 204 for the rewriting component 122-2 to use when refactoring one or more portions of the code base 202. The rewriting component 122-2 may use these rules 204 to replace the one or more portions with more efficient computer code.

According to one example embodiment, the mining component 122-1 is operative to generate syntactic abstractions of programming constructs stored in the code base 202. Each syntactic abstraction may include a representation of the corresponding programming construct where trivial differences are generalized. As described herein, the mining component 122-1 searches the code base 202 to capture universal properties of certain programming constructs to identify potential idioms.

In one exemplary embodiment, the code base 202 includes a corpus generally referring to a number of strings configured in accordance with a grammar (e.g., a programming language control structure syntax). The strings represent code fragments when the corpus is being used as a training corpus for the mining component 122-1. These code fragments may include one or more programming constructs, such as loop constructs. At least some of the constructs can be represented as syntactic abstractions such that structural similarities in syntax are generalized, and trivial differences unrelated to usage patterns or the syntax are removed. For example, two constructs may employ slightly different control structures that can be abstracted into a single control structure. When the mining component 122-1 determines that a particular construct includes idiomatic code, the mining component 122-1 may generate idiom information 206 to store a corresponding syntactic abstraction as an idiomatic code representation. The syntactic abstraction may be used to identify the particular construct as idiomatic code when used in another code base, such as a code base to undergo refactoring.

The idiom information 206 generally includes representations of programming constructs that include idiomatic code. Any one or more of these constructs can be replaced by different computer code, for example, by a function call that perform a same or similar functionality. For each representation, the idiom information 206 stores an abstraction of the idiomatic code's syntax, as expressed in the control structure, of which some portions are associated with semantic information. Such information may include purity information as described herein. Other information may be associated with the idiomatic code's syntax including usage patterns (e.g., variable usage and modification information) in control statements or expressions. Hence, each representation preserves semantic features of the control structure and generalizes structural similarities to obscure irrelevant differences in computer code that map to that representation. It is appreciated that the present disclosure may refer to the representations in the idiom information 206 as idiomatic code representations.

One or more embodiments of the mining component 122-1 generate an example idiomatic code representation in the form of a modified abstract syntax tree. In one example implementation, the mining component 122-1 generates an abstract syntax tree for a code fragment in the above mentioned corpus and modifies the abstract syntax tree as an example syntactic abstraction for that code fragment. The mining component 122-1 may localize the abstract syntax tree at a root, such as by eliminating all subtrees of the abstract syntax tree except for subtrees rooted at loop headers. The mining component 122-1 may employ a limited number of abstract node types for simplifying usage patterns and semantic features to be encoded into the modified abstract syntax tree.

To illustrate an example process to modify the abstract syntax tree, it should be noted that the mining component 122-1 may break certain rules with respect to conventional abstract syntax trees. For instance, the mining component 122-1 may create nodes that potentially refer to many variables while a node in a conventional abstract syntax tree can only refer to single variable. In order to encode variable usage patterns into the abstract syntax tree, the mining component 122-1 generates references to cover a set of nodes that refer to the same program variable. The mining component 122-1 may label nodes with zero or more references. To mitigate the effects of sparsity, the mining component 122-1 may merge two references that share the same node set. Thus, an idiom can match a concrete programming construct that contains more variables than the number of references in the idiom.

According to the example implementation, the mining component 122-1 generates an expression node to represent a concrete syntax covering a group of expressions by generalizing differences between structural patterns of the group of expressions. The expression node may be labeled with a reference for each variable and in combination with these references, the expression node covers a variety of variable names. Note, the mining component 122-1 may generate one or more expression nodes covering a specific type of expression, such as increment, decrement, and termination expressions. The mining component 122-1 may collapse all increment and decrement operations to the single node (e.g., an INC node type). The mining component 122-1 may preserve a top-level operator of a termination expression and collapse its operands to the expression node.

The mining component 122-1 also generates nodes known as regions of which each region represents a line of code lacking a control structure. A region may represent an uninterpreted function that is collapsed into a single region node labelled with references to the variables being used in that function. The mining component 122-1 also encodes purity information for each variable in the region as a child or children of the region node. The mining component 122-1 labels each child node with a corresponding variable's reference and a purity node type. As described herein, example purity node types include read (R), write (W), and read/write (RW).

The mining component 122-1 may generate the syntactic abstraction for a loop construct. Because loops constructs, generally, traverse collection data types, the mining component 122-1 may distinguish child nodes with collection data types from child nodes with unitary (e.g., primitive or non-collection) data types. For instance, the mining component 122-1 may label a child node with a U label to denote a set of unitary variables. A collection variable generally comprises a spine (CS) comprising elements (CE) and the references that interconnect the elements (CE). For collection variables, the mining component 122-1 may label a child node with either a CS or CE label to separately track mutability of a collection variable's spine (CS) and its elements (CE). This allows detection of when a collection has changed without comparing its elements to the elements in a snapshot.

The mining component 122-1 may implement a block to represent the programming construct's control structure as a graph of regions. Blocks can have multiple exits from the control structure, including break or continue statements. The mining component 122-1 assigns different node types to single and multi-exit blocks to distinguish idiomatic code with single exit blocks.

To illustrate an example refactoring process on the code base 202, consider the following example programming construct:
for (int i=0; i<data.Length; i++) {if (data[i]>max && !float.IsNaN(data[i])) max=data[i];}

The above example programming construct, by its control structure syntax, is identified as a reduce operator. The following syntactic abstraction refers to an example idiomatic code representation of a reduce operation:
for (var $0=0; $0<$EXPR($1,$2,$3); $INC($0)) {if ($EXPR($0, $1, $2, $4,
$5)) $REGION[UR($0, $1); URW($4); $C^SR($2)$; $C^ER($2)$]}

As indicated in the above example idiomatic code representation, the example programming construct substantially matches a concrete for loop. The idiomatic code representation contains the < operator in the for control statement because the expression node preserves the top-level operator in termination expressions. An INC node denotes increment expression in the for loop control structure. The idiomatic code representation contains a single block that, in turn, contains a single region that references at least four variables: $0, $1, $2, and $4. The first two are read-only unitary variables; $2 is a read-only collection; and $4 is a read-write unitary variable.

One exemplary implementation of the mining component 122-1 generates one or more rewriting rules to modify computer code fragments corresponding to the above programming construct. These rules may be used to build a refactoring tool, such as the rewriting component 122. As mentioned herein, multiple code fragments may manifest the above programming construct while being structurally different and thus, may map to a same idiom. Because the above idiomatic code representation covers these code fragments, the rewriting component 122-2 may use this representation be used to identify each code fragment in the code base 202 or another code base. It is appreciated that these rules may include the above idiomatic code representation or, alternatively, another representation of the same construct's computer code (e.g., an abstract syntax tree). The rewriting component 122-2, therefore, may use any representation to compare with identify the above programming construct's computer code.

To further illustrate the above example refactoring process on the code base 202, consider following sample computer code:

for (int i=data.Length-1; i>=0; i--) {if (data[j]>max && !float.IsNaN(data[i])) max=data[i];}

According to one example implementation, by comparing the above example idiomatic code representation with the sample computer code, the rewriting component 122-2 determines whether sample computer code comprises an idiom, such a loop idiom, based upon how the syntactic abstractions match. For example, the rewriting component 122-2 binds references in the above example idiomatic code representation to variables in the sample computer code and generates an annotated syntactic abstraction for the sample computer code as follows:

for (int i ($0)=data($2).Length($3); i ($0)>=0; i($0)--) {if (data ($2)[i ($0)]
>max ($4) && !float ($5).IsNaN(data ($2)[i ($0)])) max ($4)=data $2[i
($0)];}

When the above example programming construct is identified in another code base, the rewriting component 122-2 may replace the concrete loop in the above example programming construct with an operator such as an appropriate LINQ operator. Because the concrete loop is a reduce operation on a max value (given that the purity node types indicate read and write on a unitary variable max), the rewriting component 122-2 may replace it with the LINQ operator data.Where(cond).Aggregate((elt, max)=>accum).

The mining component 122-1 may remove the Where (cond) from the above LINQ operator. The mining component 122-1 also may replace the Aggregate function with either a Min function or Max function. It is appreciated that there are additional improvements that potentially could be made to the above LINQ operator within the scope of the present disclosure.

One example implementation of the mining component 122-1, as an option, includes a suggestion engine to identify operators, including known and new operators, or new features to add to the code base 202. For example, while identifying idiomatic code in the code base 202, the mining component 122-1 may map idiomatic code in the form of loop idioms to LINQ expressions. The mining component 122-1 may enable new LINQ operators (e.g., for loop idioms that fail to map to any LINQ expression or are incompatible with the code base 202) and quantifies each operator's benefit to the code base 202 in terms of concision and loop coverage.

The mining component 122-1, building upon the observation that some loops perform more than one impure operation (e.g. adding elements to two collections), refactors these loops to reuse intermediate results. In one example implementation, to refactor these loops with LINQ statements, the mining component 122-1 converts an intermediate LINQ expression to an object (e.g. by using ToList( )) for use in two or more other LINQ expressions. To provide a further improvement, the mining component 122-1 generates a memorization LINQ operator to stores the intermediate value, removing potential bottlenecks and other hurdles to refactoring loops into LINQ.

Figure 3:
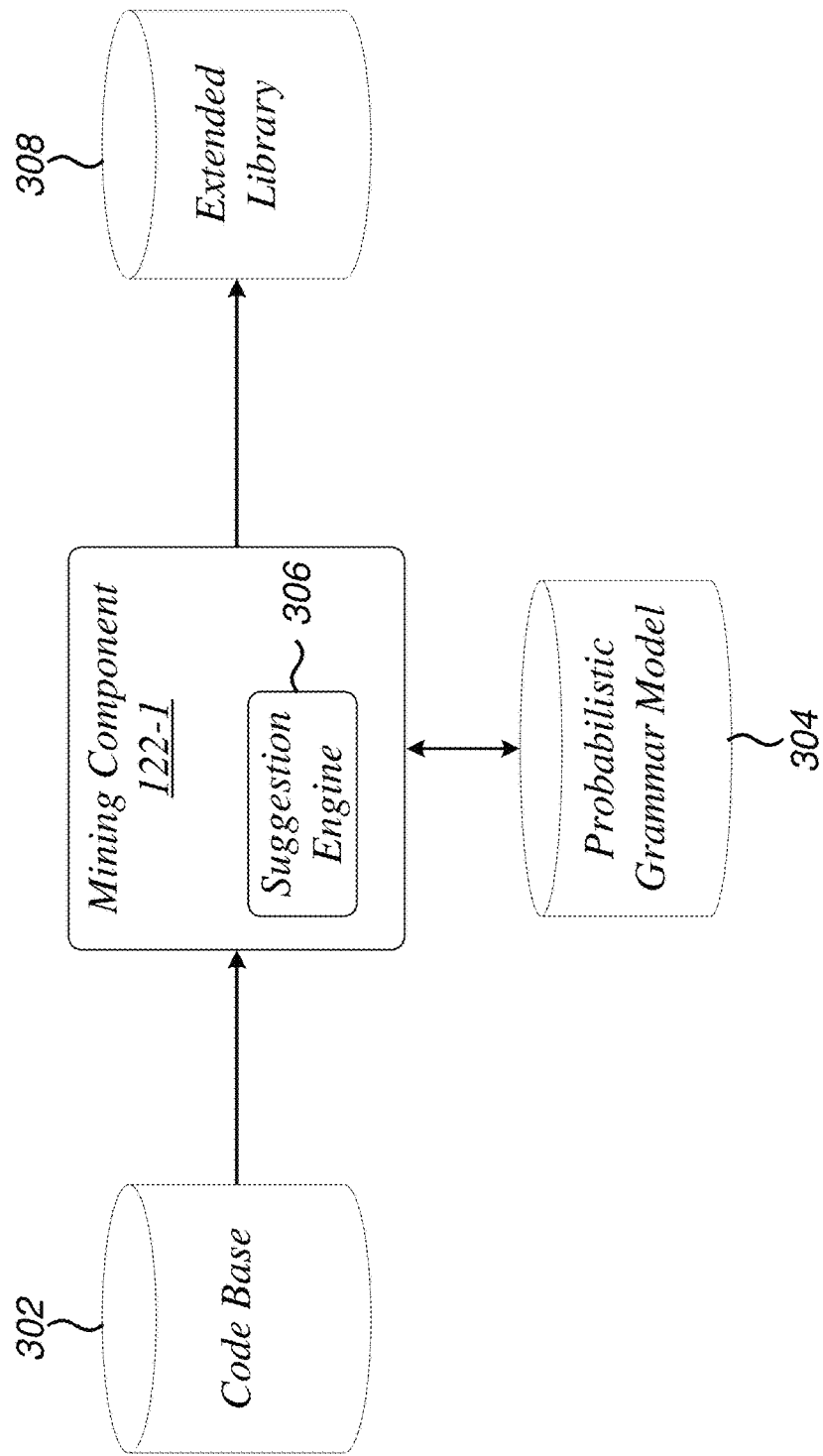
FIG. 3 illustrates an embodiment of a suggestion engine of the mining component of FIG. 2.

FIG. 3 illustrates an embodiment of an operating environment 300 for the system 100. As shown in FIG. 3, the mining component 122-1 accesses a code base 302 to identify idiomatic code in the code base 302.

The mining component 122-1 may use a probabilistic grammar model 304 of abstract syntax trees (ASTs) as a probability distribution over a set of all valid ASTs, which is equivalent to a probability distribution over all syntactically valid code fragments. One example implementation of the probabilistic grammar model 304 is a probabilistic tree substitution grammar (pTSG), which is a type of context free grammar that can generate entire abstract syntax tree fragments at once rather than one rule at a time.

By incorporating the probabilistic tree substitution grammar (pTSG), the probabilistic grammar model 304 provides a natural quantitative measure of the quality of a proposed idiomatic code. For example, comparing a probabilistic grammar model G to an alternative model G1 enables such a quantitative measure. After repeating the comparison with one or more of these alternative models $G_i$, the mining component 122-1 may compute measurements and determine which model has a higher value under the posterior distribution, which represents the value of the proposed idiomatic code. When the proposed idiomatic code is included into a pTSG, the proposed idiomatic code increases the probability that the pTSG assigns to the corpus. Hence, the mining component 122-1 uses the quantitative measure of the idiomatic code's quality to eliminate idiomatic code that may frequent but of little use.

The mining component 122-1 may model the proposed idiomatic code as a pTSG (grammar) G. Therefore, inferring idioms may be accomplished by inferring a pTSG (grammar) G. According to one example implementation, the mining component 122-1 employs Bayesian inference to infer the pTSG G. The prior distribution P(G) may be a probability distribution over probabilistic grammars. A sample from P(G) is a pTSG, which can be specified by the set of code fragments FX that are rooted at each nonterminal X, and a distribution $P_{TSG}(FX|X)$ over rules that can be used to expand each nonterminal X. Sampling this pTSG we can get source code ASTs. P(G) may be considered a penalty function that specifies a set of constraints to characterize a TSG that is independent of the code base.

Applying a Pitman-Yor process prior within P(G) provides a number of properties: 1) There is no a priori upper bound on the size of the TSG (that is, the method is nonparametric). This is important because an upper bound on the size of the TSG would yield the number of idioms we are able to infer. 2) The prior P(G) tends to favor grammars that are not too large, and for which the individual fragments are not too large. This creates a penalty that discourages the method from memorizing the training set. 3) The technical properties of the Pitman-Yor process may result in a few idioms are seen very frequently while the great majority of idioms are used less commonly.

Given a prior distribution over pTSGs P(G), each possible value of G, like any pTSG, defines a distribution P(T1, T2, ... TN|G) over the training set. A posterior distribution P(G|T1, T2, ... TN) represents for every possible pTSG G, a probability generated by G generate of the observed data set. Applying Bayes's rule, the posterior distribution P(G|T1, T2, ... TN) is computed as:

$$P(G \mid T_1, T_2 \ldots T_N) = \frac{\prod_{i=1}^{N} P(T_i \mid G) p(G)}{p(T_1, T_2 \ldots T_N)}$$

As described above, the mining component 122-1 generates the posterior distribution to assign a high probability to grammars G which further assign a high probability to the data (this is $P(T_i|G)$) and receive a high score according the prior distribution p(G). As the denominator in the equation does not depend on G, it plays no effect in the relative probability under the posterior distribution between two competing TSGs. If the posterior distribution cannot be computed exactly, one example implementation employs a numerical approximation technique.

The mining component 122-1 includes a suggestion engine 306 to identify a new operator to improve to the code base 302 and, in some instances, to add the new operator to an extended library 308. It is appreciated that in some exemplary embodiments, the mining component 122-1 also generates computer code implementing the new functional operator to add to the extended library 308.

To illustrate by way of example, some idiomatic code whose differences are convoluted are not easily replaceable by a known functional operator; hence, a new operator is suggested. In one example implementation, the mining component 122-1 generates computer code to implement the new operator in the form of a programming construct (e.g., C# code, a C# LINQ operator or JavaStreams). The computer code may be added to the extended library 308 for the code base 302.

In one exemplary embodiment, the code base 302 includes a class-based interface with certain functionality, such as an application programming interface for a database application or a networking application. The extended library 308 supports the application programming interface that comprises various object classes and functions by supplying additional classes and/or functions. An application in the code base 302, therefore, may communicate with the extended library 308 as an extension to the functionality implemented in the application programming interface. The suggestion engine 302 of the mining component 122-1, in addition to or instead of identify the new operator for the extended library 308, may identify a new method for the application in the code base 302 to implement. It is appreciated that in some exemplary embodiments, the mining component 122-1 generates computer code implementing the new method for the application to add to the code base 302.

As an example, applications developers using the code base 302 may define collection-like objects with incompatible interfaces to the extended library 308, requiring a native method in the code base 302. To illustrate, consider an application in the code base 302 using a method AddDocument that does not support any operation adding more than one object at a time to a collection of document. Such a restriction forces the developers to consistently write loops that perform this operation, such as the following example loop idiom:

for (int i=0; i<numDocs; i++) {
Document doc=function_to_get_doc(i);
writer.AddDocument(doc);}

In response to the above method, the suggestion engine 306 of the mining component 122-1 may produce information indicating that by adding an AddDocuments method that accepts enumerable variable types, the code base 302 is transformed into a simpler and more efficient code base 302. The following represents an example functional operator calling the above AddDocuments method writer.AddDocuments(Range(0,numDocs).Select(i=>function_to_get_doc(i))).

The suggestion engine 306 may identify and/or generate new features for the code base 302 and/or the extended library 308 to the code base 302 according to some exemplary embodiments. In some instances, because both traversed collection elements and a loop control variable are needed for a loop construct, a potential new feature would be the introduction of an Enumerate function that would jointly return an index and one or more elements of the collection. Doubly nested loops may be abstracted using the Enumerate function since known indexing functionality does not support n-dimensional sequences.

Some loop idioms perform more than one impure operation (e.g. adding elements to two collections), while efficiently reusing intermediate results. The suggestion engine 306 may produce information notifying a developer of these loop idioms. Instead of refactoring one of these loop idioms into an operator, to further improve performance, the mining component 122-1 may generate information suggesting a conversion of an intermediate (e.g., query) expression in the operator into an object (e.g. by using ToList( )) for use in two or more other expressions.

Figure 4:
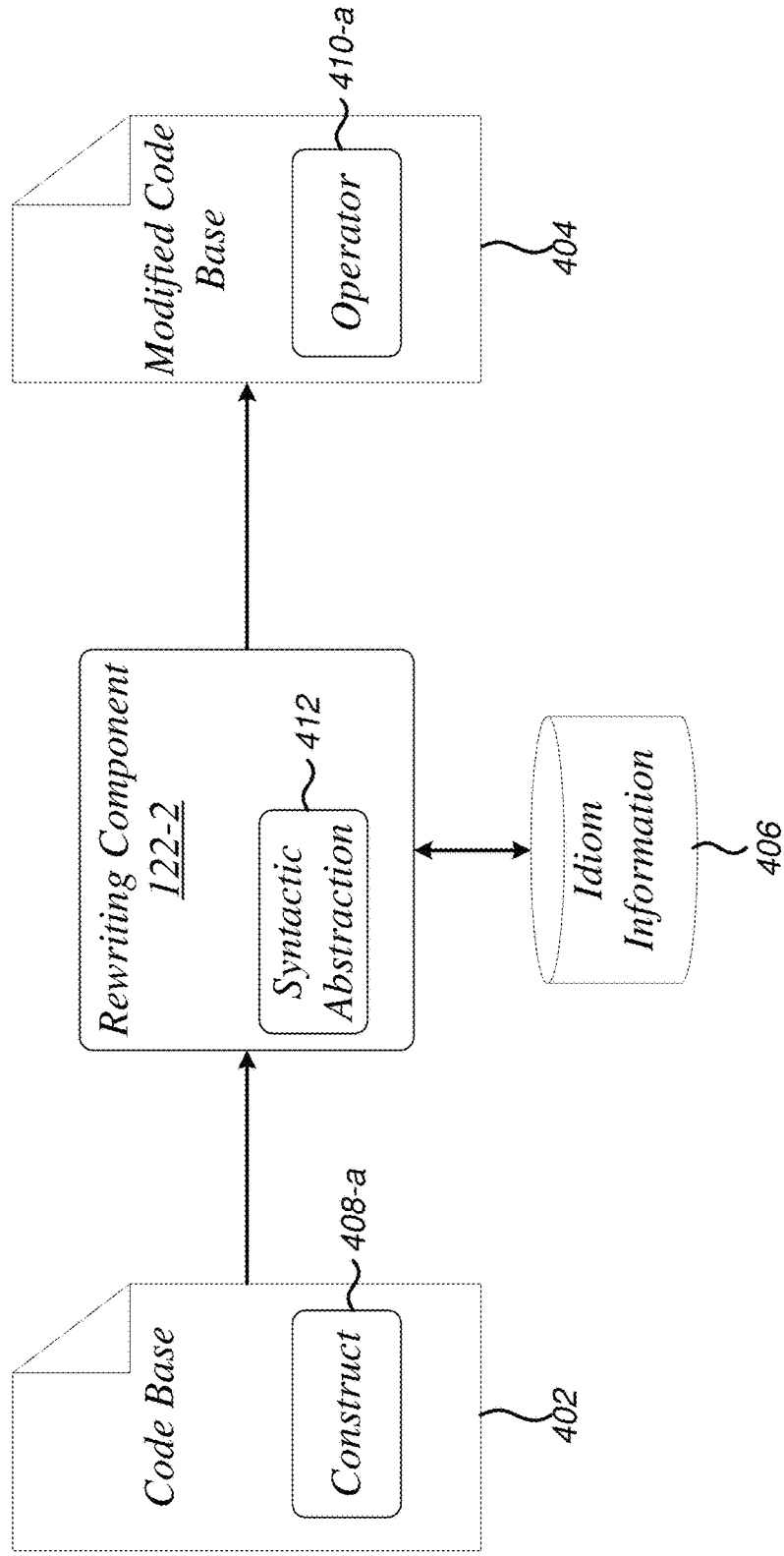
FIG. 4 illustrates an embodiment of a rewriting component for the system of FIG. 1.

FIG. 4 illustrates an embodiment of an operating environment 400 for the system 100. As shown in FIG. 4, the rewriting component 122-2 is operative to receive as input a code base 402 and generate as output a modified code base 404. In one example embodiment, the rewriting component 122-2 is operative to modify one or more portions of the code base 402 using idiom information 406 by replacing one or more programming constructs 408-*a* with one or more operators 410-*a*. Each operator 410-*a*, being an equivalent query expression to the corresponding programming construct 408-*a*, is inserted by the rewriting component 122-2 into the code base 402.

The idiom information 406 generally includes representations of programming constructs that include idiomatic code and can be replaced by operators. Hence, each idiomatic code representation generalizes a set of loop constructs to obscure structural similarities amongst the loop constructs such that each can be replaced by an operator.

According to one example embodiment, the rewriting component 122-2 is operative to generate a syntactic abstraction 412 of the programming construct 408-*a*. The syntactic abstraction 412 may include a representation of the construct 408-*a* such that trivial differences are generalized. The rewriting component 122-2 may generate an abstract syntax tree from a programming construct and perform a process to modify the abstract syntax tree using techniques described herein for the mining component 122-1.

To illustrate an example refactoring process on the code base 402, consider the following example computer code:

for (int i=0; i<data.Length; i++) {if (data[i]>max &&
!float.IsNaN(data[i])) max=data[i];}

The rewriting component 122-2 binds references in an idiomatic code representation in the idiom information 406 to variables in the above sample computer code and generates an annotated construct as follows:

for (int i ($0)=0; i ($0)<data($2).Length($3); i($0)++) {if
(data ($2)[i ($0)]
>max ($4) && !float ($5).IsNaN(data ($2)[i ($0)])) max
($4)=data $2[i
($0)];}

One example implementation of the rewriting component 122-2 is operative to identify operators, including known and new operators, or new features to add to the code base 402. For example, while identifying idiomatic code in the code base 402, the rewriting component 122-2 may transform idiomatic code in the form of loop idioms to LINQ expressions. The rewriting component 122-2 enables new LINQ operators (e.g., for loop idioms that fail to map to any LINQ expression or are incompatible with the code base 402) and quantifies each operator's benefit to the code base 402 in terms of concision and loop coverage.

The rewriting component 122-2, building upon the observation that some loops perform more than one impure operation (e.g. adding elements to two collections), refactors these loops to reuse intermediate results. In one example implementation, to refactor these loops with LINQ statements, the rewriting component 122-2 converts an intermediate LINQ expression to an object (e.g. by using ToList( )) for use in two or more other LINQ expressions. To provide a further improvement, the rewriting component 122-2 generates a memorization LINQ operator to stores the intermediate value, removing potential bottlenecks and other hurdles to refactoring loops into LINQ.

Figure 5:
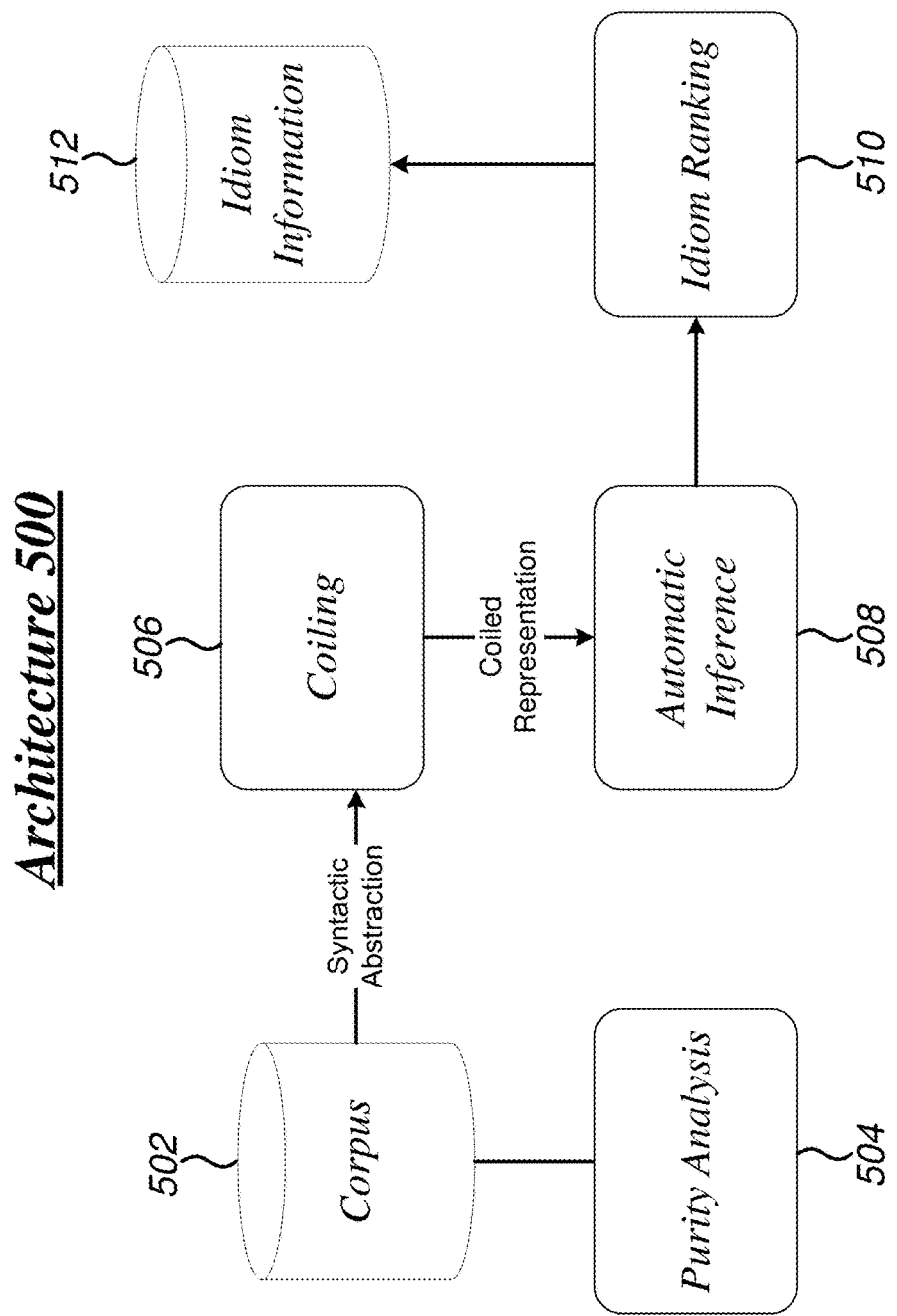
FIG. 5 illustrates an embodiment of an architecture of the mining component of FIG. 2.

FIG. 5 illustrates an embodiment of an architecture 500 for the system 100. As shown in FIG. 5 and also described herein, the architecture 500 may be employed by the mining component 122-1 of the apparatus 120 in the system 100. It is appreciated, as an alternative, that the rewriting component 122-2 also may utilize one or more components of the architecture 500.

In the architecture 500, a corpus 502 provides the mining component 122-1 with code fragments that employ programming constructs. While the following description refers to techniques to mine loop idioms from these programming constructs, it is appreciated that these techniques are applicable towards mining other idiom types. For example, these techniques may be used to mined idioms from condition constructs and exception handling constructs.

Once a loop construct is identified, a purity analysis 504 generates purity information to embed into a syntactic abstraction known as a coiled abstract syntax tree. In general, a code fragment is pure for a variable (or globally) when it is does not write to that variable during its execution. Impurity, its complement, can be detected by running the code fragment and testing the code fragment's functionality.

In one example implementation of the purity analysis 502, dynamic purity detection is based on testing. Given a method and a test suite that invokes that method, the purity analysis 502 runs the test suite and snapshot memory before and after each invocation of the method. If the memory is unchanged across all invocations, the method is pure modulo the test suite; otherwise, the method is classified as impure. To generate a snapshot of the heap, the purity analysis 502 traverses the heap starting at the method's reference arguments and global variables. The heap is an arbitrary graph that the purity analysis 502 traverses breadth first by ignoring backedges and compute a hash value. The purity analysis 502, by comparing the hashes of the before and after invocation snapshots, infers variable granular purity.

To represent the method as the coiled abstract syntax tree, a conventional abstract syntax tree may be generated and then, modified by loop coiling 506, a process by which structural similarities are generalized and differences are removed or simplified into abstract nodes. Because a goal of the architecture 500 is to infer loop idioms that incorporate and therefore match patterns of variable usage, the loop coiling 506 process encodes variable usage patterns back into the abstract syntax tree via referencing. Generally, a reference is a set of nodes that refer to the same program variable.

The loop coiling 506 process also preserves variable usage patterns in one or more expression node types. Each expression node type is extraction of a set of expressions. In one example implementation, a single abstract node type may be universal to all or most expressions. The loop coiling 506 process also abstracts straight line code lacking control statements as a region node type and encodes variable usage patterns using purity information, references, and other information into a node of such type. As described herein, the loop coiling 506 process encodes purity information of each variable in a region as children of the region's node. The loop coiling 506 process labels each child node with a corresponding variable's reference and a node type that indicates its purity in the region, such as R, W, and RW.

Once the loop coiling 506 process generates a coiled abstract syntax tree for a number of the loop constructs in the corpus 502, loop idioms are identified via automatic inference 508. As described herein, inferring idioms may be accomplished by inferring a pTSG (grammar) G via non-parametric Bayesian inference. The mining component 122-1 selects those loop idioms that are helpful in characterizing the target loop constructs, such as idioms that maximize information content and loop coverage.

An idiom ranking 510 process computes a score for each idiom by multiplying the idiom's coverage with the idiom's cross-entropy gain. Generally, cross-entropy gain measures the informativeness of the coiled abstract syntax tree and is the average (over the number of Context-Free Grammar (CFG) productions) log-ratio of the posterior pTSG probability of the idiom over its PCFG probability. The idiom ranking 510 ranks the idioms based on their scores and pick the first top idiom. Then, idiom ranking 510 process removes all loops that were covered by that idiom and recomputes the scores. The idiom ranking 510 repeats this until there are no more loops covered by the remaining idioms. Using this greedy knapsack-like selection, idiom ranking 510 process identifies the idioms that achieve both high coverage and are highly informative. The idiom ranking 510 stores coiled abstract syntax tree for these idioms into idiom information 512. The idiom ranking 510 process takes into consideration implicitly purity information as well as the other information about the loop through the structure of the coiled abstract syntax tree s.

Figure 6:
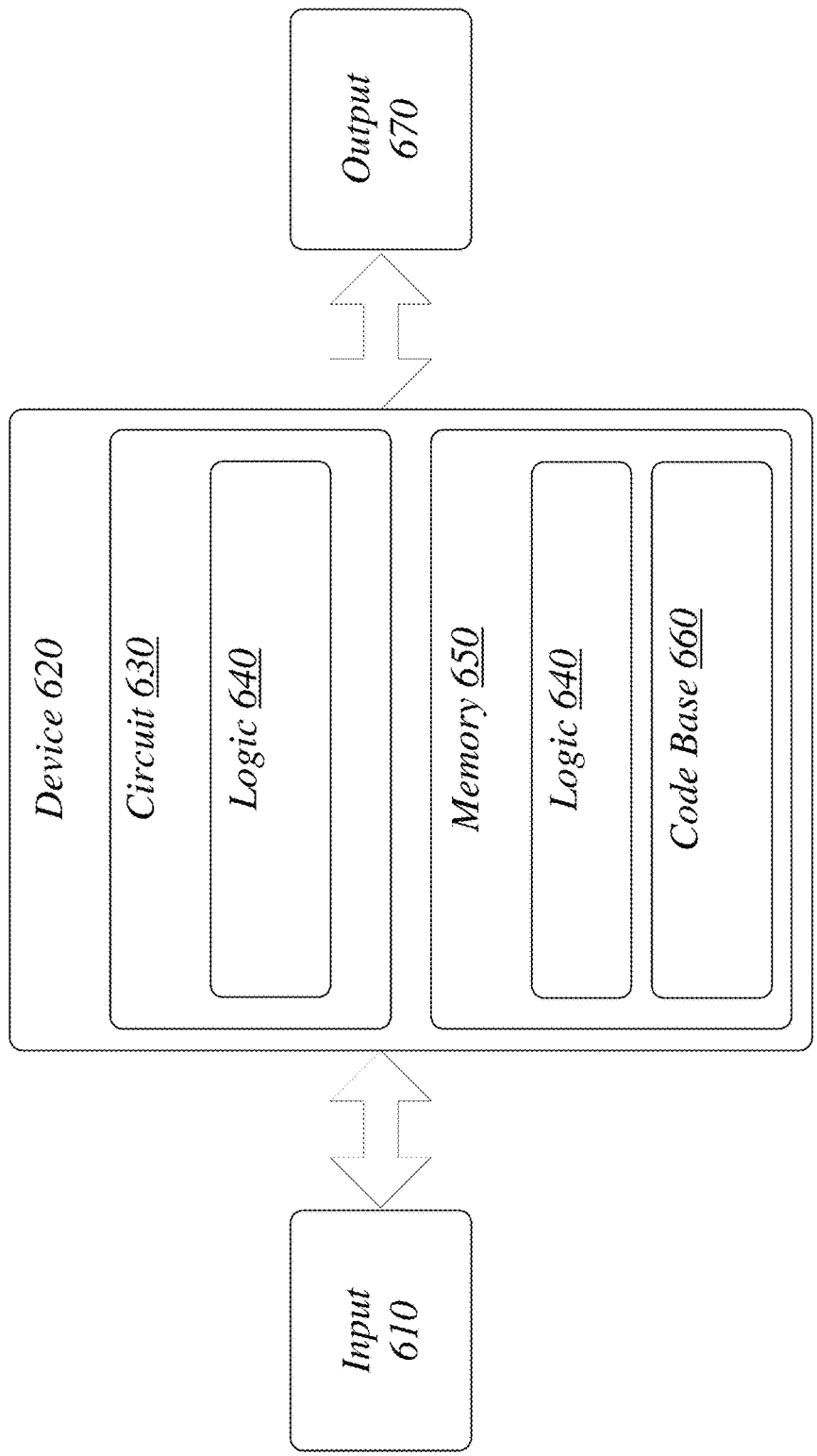
FIG. 6 illustrates an embodiment of an apparatus for the system of FIG. 1.

FIG. 6 illustrates a block diagram of an apparatus 600. As shown in FIG. 6, the apparatus 600 may implement some or all of the structure and/or operations for the system 100 in a single computing entity, such as entirely within a single device 620.

The device 620 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 620 may execute processing operations or logic for the system 100 using a circuit 630. The device 620 may execute communications operations or logic for the system 100 using communications component 840. The device 620 includes a circuit 630 having logic 640 operative on the circuit 630 and memory 640 to store the logic 640 before execution on the circuit 630. The memory 640 also stores a code base 660. The logic 640 (e.g., the mining component 122-1 of FIG. 1) implements a mining process to identify idioms for a covered set of idioms to improve the execution of at least a portion of the code base 660 as described herein. The logic 640 may generate rules mapping each idiom of the covered set of idioms to an operator in an extended function library.

For example, a portion of the code base 660 generally refers to a code fragment operative on the circuit 630 to perform some operation. The logic 640 may further include a refactoring tool configured to modify the code base 660 by replacing the code fragment with a function call to an operator that more efficiently perform the same operation and produce the same result. Alternatively, the logic 640 generates a control directive to execute the operator instead of the code fragment (e.g., via a hook) to improve the execution of the code base 660.

Figure 7:
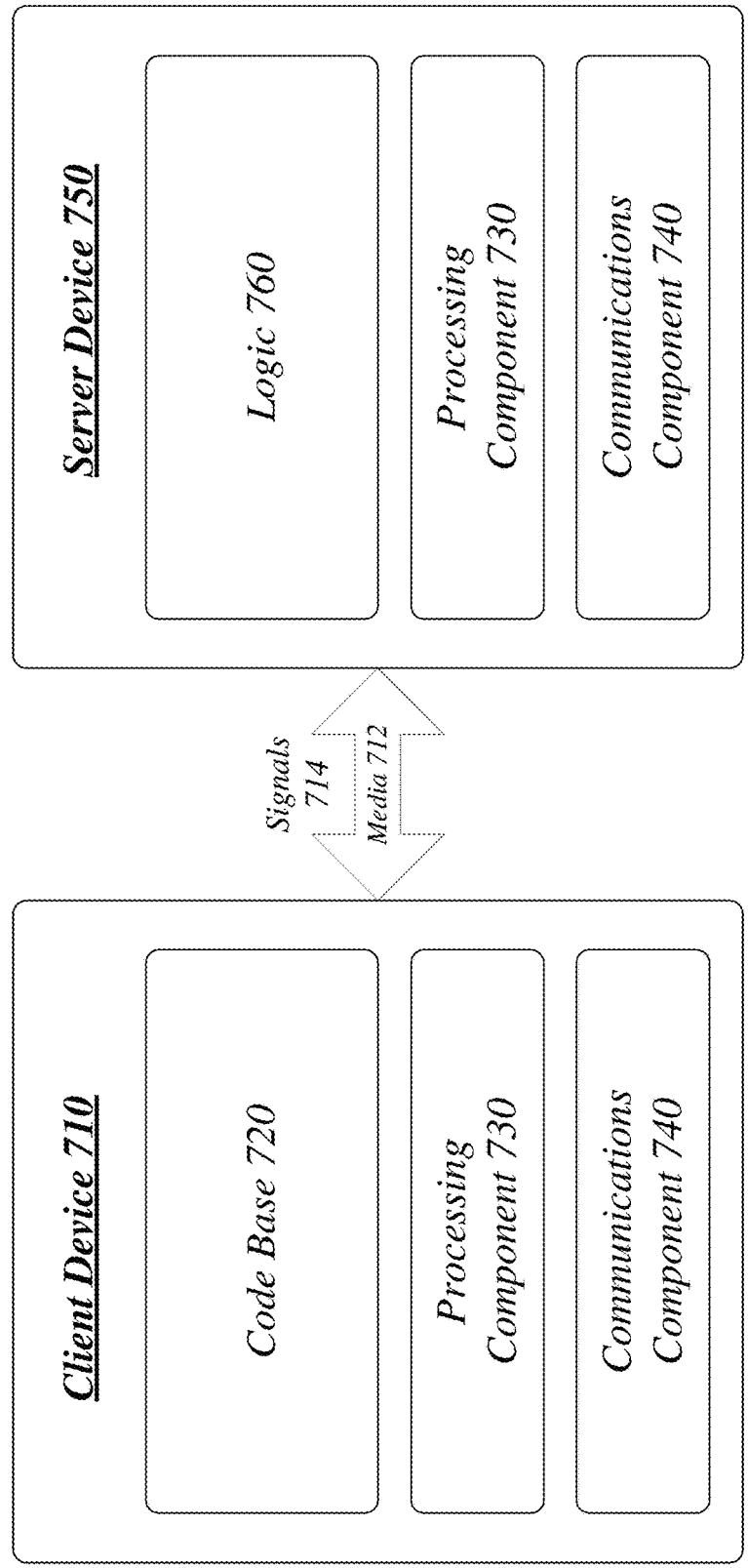
FIG. 7 illustrates an embodiment of a distributed system for the apparatus of FIG. 6.

FIG. 7 illustrates a block diagram of a distributed system 700. The distributed system 700 may distribute portions of the structure and/or operations for the system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a client device 710 and a server device 750. In general, the client device 710 and the server device 750 may be the same or similar to the device 620 as described with reference to FIG. 6. For instance, the client system 710 and the server system 750 may each comprise a processing component 730 and a communications component 740. In another example, the devices 710, 750 may communicate over a communications media 712 using communications signals 714 via the communications components 740.

The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712, 742 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 720 may communicate with other devices 710, 750 over a communications media 712, 742, respectively, using communications signals 714, 744, respectively, via the communications component 740. The devices 710, 750 may be internal or external to the device 720 as desired for a given implementation.

The client device 710 and the server device 750 may comprise or employ one or more computer programs, respectively, that operate to perform various methodologies in accordance with the described embodiments. In one embodiment, for example, the client device 710 may implement a code base 720 comprising code fragments. Logic 760 executed by the server device 750 enhances the code base 720 by determining which code fragments include loop idioms and whether those loop idioms would contribute towards refactoring similar code bases. The logic 760 may be further operative to identify equivalent operators for replacing the loop idioms in the code base 720. In one alternative embodiment, for example, the server device 750 may direct the logic 760 to improve the code base 720 by suggesting modifications to the code base 720, such as new functional operators for loop idioms that do not map to corresponding known operators. It is appreciated that the logic 760 also may identify a new operator for loop idioms that do map to a known operator if the new operator will result in an improved modified code base 720.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein. Executing logic to perform the logic flow 800 results in a representation for idiomatic code that preserves semantic information while removing unnecessary information as described herein.

In the illustrated embodiment shown in FIG. 8, the logic flow 800 identifies one or more programming constructs based on a control structure at block 802. For example, the logic flow 800 may identify a set of programming constructs that adhere to certain syntax rules with respect to the control structure in each programming construct. Hence, programming constructs in the set may use different variable names and have other differences but also have structural similarities with each other.

The logic flow 800 may generate a syntactic abstraction to associate semantic information with portions of the control structure at block 804. The logic flow 800 may generate the syntactic abstraction to generalize the above mentioned structural similarities and capture the semantic information such that the programming constructs can be identified as being semantically similar. The semantic information may relate to a task being performed by the one or more programming constructs and further may indicate which lines of computer code impact performance of that task. The semantic information may describe features corresponding to purity analysis, resource management (e.g., memory utilization, network bandwidth consumption, processor cycles, and/or the like), pointer analysis, aliasing, nullity, and other semantic features.

It should be noted that specific semantic features may be pre-defined as items of interest such that the logic flow 800 annotates the syntactic abstraction primarily with these semantic features or, alternatively, only with these semantic features. For instance, the logic flow 800 may annotate the syntactic abstraction with semantic information describing which resources are being created or destroyed and, possibly, which variables are instantiated for those resources. The logic flow 800 may annotate the syntactic abstraction with information indicating memory allocations greater than a particular size. As an option, the syntactic abstraction also may capture non-semantic information, such as usage pattern information and modification information for variables.

The logic flow 800 may determine that the syntactic abstraction corresponds to an idiom using probabilistic grammars at block 806. The logic flow 800 may generate a probabilistic grammar model configured with distributions over the above mentioned control structure syntax rules. Since those syntax rules constitute grammar rules where the known grammar is the appropriate programming language syntax and any applicable application programming interface (API), the distributions in the model may measure an alignment between a control structure syntax rule and the programming syntax. By characterizing the syntactic abstraction as grammar rule (e.g., a combination of contiguous syntax rules), the probabilistic grammar model may be used to produce a quantitative measurement as to a quality of the syntactic abstraction in view of the known grammar. As an example, the quality of the syntactic abstraction may indicate how accurate that abstraction represents the set of programming constructs such that the semantic information is preserved. A substantial qualitative value may indicate that some or all programming constructs in the set, when manifested as computer code in a code base, are identifiable using the syntactic abstraction.

The logic flow 800 may select the idiom based on coverage and information content amongst a set of idioms at block 808. As described herein, the logic flow 800 may compute a value combining various measurements of coverage and information content and determine the idiom's ranking amongst the other idioms in the set of idioms. The idiom's ranking may indicate a probability that the corresponding programming constructs are replaceable, for example, by one or more operators. As example, one of these programming constructs, when manifested as computer code in a code base, may be replaced by an operator in an extended function library of the code base's API. The embodiments are not limited to this example.

FIG. 9 illustrates one embodiment of a logic flow 900. The logic flow 900 may be representative of some or all of the operations executed by one or more embodiments described herein. Executing logic to perform the logic flow 900 analyzes a corpus comprising computer code for a covered set of idioms for use in rewriting the computer code as described herein. The computer code may be arranged as a plurality of programming constructs that are represented as abstract syntax trees. These abstract syntax trees (ASTs) initially are syntactic structures and do not include any semantic information.

In the illustrated embodiment shown in FIG. 9, the logic flow 900 partitions a plurality of programming constructs into sets of programming constructs based on control structure syntax at block 902. For example, the logic flow 800 may partition ASTs into separate sub-ASTs and localize each sub-AST at a root node. The logic flow 800 may compare synaptic structures of the sub-ASTs and identify those sub-ASTs having structural similarities according to syntax rules of an applicable programming language (grammar).

The logic flow 900 may generate for each set of programming constructs a syntactic abstraction to include semantic features of the control structure syntax being used in that set at block 904. For example, the logic flow 900 may generate the abstraction from the sub-AST by replacing variable names with generic references, abstracting semantics by replacing portions of the sub-AST with abstract nodes. The logic flow 900 may store semantic information in the abstract nodes such that the syntactic abstraction may then be used to identify other programming constructs having semantic similarity as well as sharing a syntactic pattern.

The semantic information may be compared with another programming construct's semantic information to determine whether both constructs perform a same or substantially the same functionality.

The logic flow 900 may rank the syntactic abstractions at block 906. As described herein, the logic flow 900 may compute a value based upon coverage and information content for each syntactic abstraction and then, rank the syntactic abstractions according the values. Based upon this ranking, the logic flow 900 may select an abstraction as an idiom in a set of idioms at block 908. The logic flow may determine whether the set of idioms constitutes a covered set of idioms for the refactoring tool at decision block 910. If the set of idioms does qualify the logic flow 900, the logic flow proceeds to block 912. If the set of idioms does not qualify as the covered set, the logic flow 900 returns to block 906 to rank the syntactic abstractions and to block 910 to select another syntactic abstraction for the set of idioms. The logic flow 900 repeats the determination at decision block 910 and returns to block 906 if needed until the covered set of idioms is achieved.

The logic flow 900 may generate rules for rewriting computer code matching the syntactic abstractions in the covered set of idioms at block 912. It is appreciated that for any one syntactic abstraction, the matching computer code may or may not resemble any of the programming constructs in the corresponding set of programming constructs. In some example embodiments, the matching computer code, although structurally different, may be semantically similar; and therefore, the matching computer code may be rewritten as more optimal computer code. As an example, the matching computer code may be replaced by a function call to an operator in an extended library. As another example, the matching computer code may be replaced by another programming construct. The embodiments are not limited to this example.

FIG. 10 illustrates one embodiment of a logic flow 1000. The logic flow 1000 may be representative of some or all of the operations executed by one or more embodiments described herein. Executing logic to perform the logic flow 1100 mitigates or resolves altogether inefficiencies or errors in computer code as described herein.

In the illustrated embodiment shown in FIG. 10, the logic flow 1000 generate a syntactic abstraction with semantic information from an abstract syntax tree of a loop construct at block 1002. For example, the syntactic abstractions include abstract syntax trees configured with generic node types. An abstract syntax tree may represent a loop construct's control structure and each node type may be an abstraction of some syntactic aspect in that structure. For example, example node types may be abstractions of non-control statements, expressions, regions, and so forth. The loop construct can be generalized using these node types.

The logic flow 1000 may store information corresponding to purity and/or usage patterns associated with the control structure at block 1004. For example, the logic flow 1000 may modify the abstract syntax tree (AST) with generic variables to generalize the actual variable name and add references between one or more nodes and a generic variable. The logic flow 1000 may store in one or more AST nodes purity information related to read or write activities corresponding portions of the loop construct.

The logic flow 1000 may determine that the programming construct comprises idiomatic code at block 1006. For example, the logic flow 1000 may use techniques implementing tree substitution grammars to infer the idiomatic code. In another example embodiment, the logic flow 1000 identifies a generic operation being implemented in the loop construct by comparing the modified AST with modified ASTs for other loop constructs implementing the same generic operation. The modified ASTs for the other loop constructs may be codified in idiom information, for instance, as a rewriting rule indicating a specific functional operator (on a right hand side of the rewriting rule) to perform the generic operation (on a left hand side).

The logic flow 1000 may generate information corresponding to modifying the code base at block 1008. For example, if the logic flow 1000 identifies the operator that performs an equivalent operation to the generic operation being implemented by the idiomatic code, the logic flow 1000 generates information suggesting to a developer the operator as a potential replacement for the idiomatic code. Some example implementations may improve idiomatic C# code by generating suggestion information indicating an operator in an extended library to C#, such as a LINQ operator. Such suggestion information, alternatively, may identify a new LINQ operator to add to the extended library. As another alternative, the logic flow 1000 may generate information suggesting a new method to replace the idiomatic code or improve upon the idiomatic code. The embodiments are not limited to this example.

Figure 11:
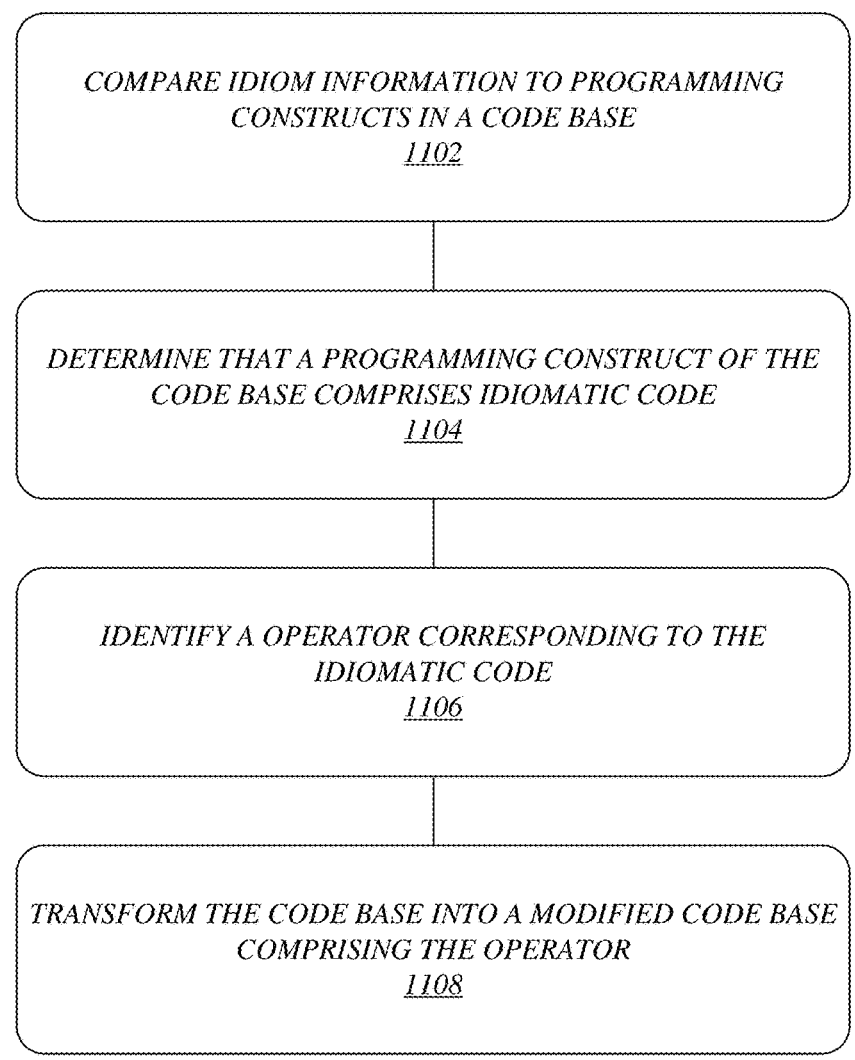
FIG. 11 illustrates an embodiment of a logic flow for the rewriting component of FIG. 4.

FIG. 11 illustrates one embodiment of a logic flow 1100. The logic flow 1100 may be representative of some or all of the operations executed by one or more embodiments described herein. Executing logic to perform the logic flow 1100 mitigates or resolves altogether inefficiencies or errors in computer code as described herein.

In the illustrated embodiment shown in FIG. 11, the logic flow 1100 compares idiom information to a code base at block 1102. The idiom information may include representations of idiomatic computer code of which each representation stores an abstraction of the idiomatic computer code's control structure. Each representation uses a few generic abstract types to represent different aspects of the control structure and to store various information, such as semantic information. The semantic information may include purity information. Other information may include variable usage patterns.

Each idiomatic code representation in the idiom information may be configured to be generic for a set of programming constructs such that non-structural differences are removed and some structural differences are simplified. For example, there are many loop constructs capable of iterating through a list to compute a sum, making such loop constructs interchangeable in computer code implementing a sum operation. Hence, the choice of loop construct in the computer code does not result in a different representation because it does not change the fact that the computer code is a sum operation. Hence, the representation should be generic to a set of sum operations.

Comparing the idiom information with the code base may involve identifying a programming construct to compare with the representations of idiomatic computer code. A programming construct may be a portion of the computer code in the code base. For example, the programming construct may be a code fragment comprising a for loop, a while loop, or any other loop construct configured for a programming language. As described herein, the programming construct, when executed by a processor, may cause inefficient or error-prone computer operation. The logic flow 1100 identifies functional operators to improve upon a current implementation of the computer code as described below.

The logic flow 1100 may determine that a portion of the code base comprises idiomatic code at block 1104. For example, the logic flow 1100 may generate a syntactic abstraction of variable usage patterns in the programming construct mentioned above to compare with the idiomatic code representations in the idiom information. The syntactic abstraction may include a representation of the programming construct's control structure that is annotated with various information, such as information corresponding to variable usage, purity, and/or the like. Similar to the idiomatic code representations, the syntactic abstraction captures the programming construct's control structure and variable usage patterns while abstracting away trivial aspects that do either don't relate to the control structure or do not affect the programming construct's functionality.

The logic flow 1100 may identify an operator corresponding to replacing the idiomatic code at block 1106. For example, the programming construct may be a sum operation similar to the one mentioned above. The idiom information stores mappings between the idiomatic code representations and functional operators including a mapping between the idiomatic code and an operator for the sum operation. The logic flow 1100 extracts such a mapping from the idiom information and may generate information for displaying indicating that the programming construct can be replaced.

The logic flow 1100 may transform the code base into a modified code base comprising the operator at block 1108. The logic flow 1108 may generate code for implementing the operator to insert into the modified code base. The logic flow 1108 may also replace the programming construct with an operator that is equivalent to the idiomatic code. Alternatively, the logic flow may perform any one or combination of identifying a new functional operator corresponding to the programming construct, converting an intermediate expression in the programming construct to an object for use in another expression in the programming construct, or identifying a new feature for an application programming interface being used in the programming construct. The embodiments are not limited to this example.

FIG. 12 illustrates one embodiment of a logic flow 1200. The logic flow 1200 may be representative of some or all of the operations executed by one or more embodiments described herein. In the illustrated embodiment shown in FIG. 12, the logic flow 1200 performs one or any combination of the operations at blocks 1202, 1204, 1206, and 1208. Each operation improves an operation of computer code in a code base.

The logic flow 1200 replaces a loop idiom in the code base with an operator at block 1202. The operator produces a same or similar result as the loop idiom and affects the code base in a comparable manner. For example, the logic flow 1200 may remove C# code implementing the loop idiom and identify a C# LINQ operator that is a functional equivalent loop idiom. The logic flow 1200 may generate C# code with a function call and an appropriate syntax corresponding to a C# LINQ operator and then, insert that C# code into a same position of the loop idiom. While the C# LINQ operator may execute different instructions as the C# code for the loop idiom, the C# LINQ operator generates the same result.

The logic flow 1200 may identify a new functional operator to implement for an extended library at block 1204. For example, if no known LINQ operator is equivalent to the loop idiom, a new C# LINQ operator to produce a same result as the loop idiom will improve the code base. The logic flow 1200 may generate C# code for the C# LINQ operator and add the C# LINQ operator to a LINQ function library.

The logic flow 1200 may generate code for a new method to add to the code base at block 1206. For example, if no known LINQ operator is equivalent to the loop idiom, a new method to produce a same result as the loop idiom or, alternatively, a new method to operate with the loop idiom will improve the code base. The logic flow 1200 may generate C# code for the new method and add the C# code to the code base.

The logic flow 1200 may convert an intermediate expression to an object for use in another expression in the operator at block 1208. For example, the logic flow may add the object's C# class to the code base with a method that implements the intermediate expression and an interface for the C# LINQ operator. The logic flow 1200 generates the C# object and provides access to the results of the intermediate expression. The embodiments are not limited to this example.

Figure 13:
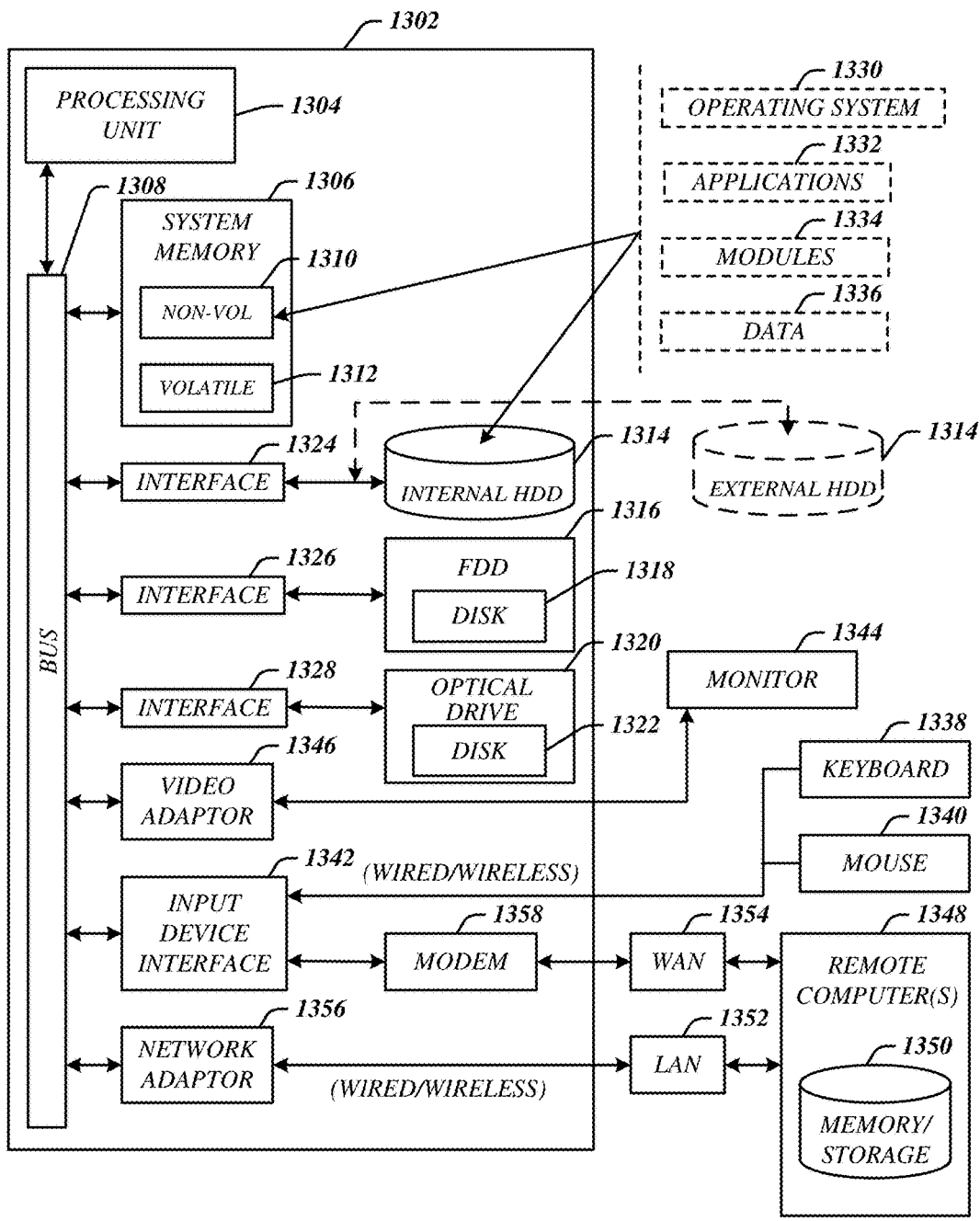
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 6, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
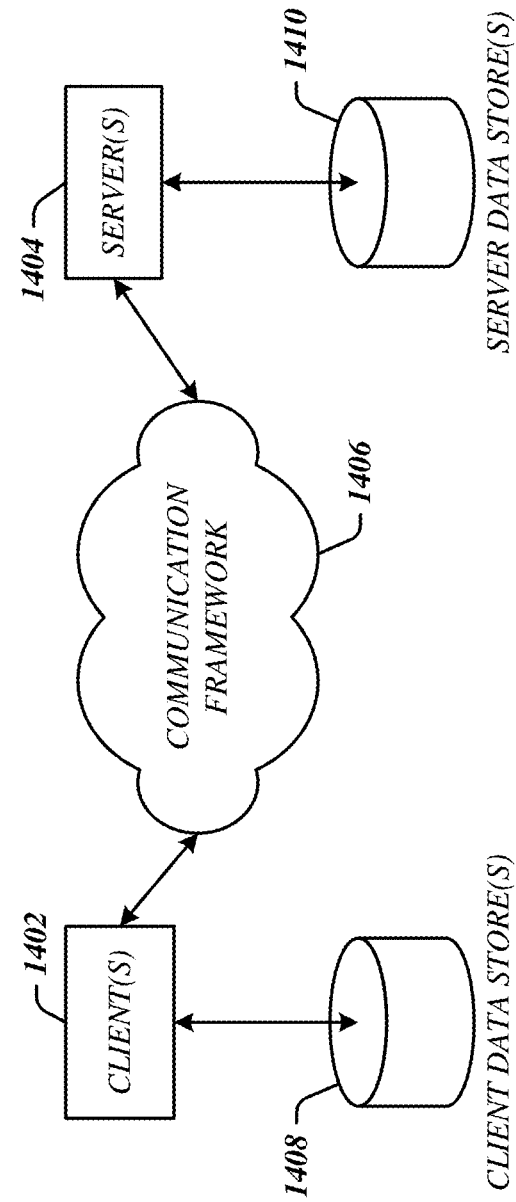
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement the client device 710. The servers 1404 may implement the server device 950. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some exemplary embodiments include an apparatus comprising a logic circuit and logic operative on the logic circuit to identify programming constructs based on a control structure, generate information to represent the programming constructs, the information comprising a syntactic abstraction to associate semantic information with portions of the control structure, and select the syntactic abstraction as an idiom based on coverage and information content amongst a set of idioms.

The apparatus described in the preceding paragraph may further comprise logic operative to determine that the syntactic abstraction corresponds to the idiom based upon a probabilistic grammar model. The apparatus described in the preceding paragraph comprising logic operative to transform a code base into a modified code base comprising at least one operator configured to perform a functionality of the programming constructs. The apparatus described in any of the preceding paragraphs may further comprise logic operative to generate a rewriting rule to map the syntactic abstraction to an operator or another programming construct.

The apparatus described in any of the preceding paragraphs may further comprise logic operative to partition a plurality of programming constructs into sets of programming constructs amongst of which each set of programming constructs corresponds to a control structure syntax, generate a syntactic abstraction to include semantic features of the control structure syntax for each set of programming constructs, rank the sets of the of programming constructs based upon coverage and information content, and select at least one syntactic abstraction for a rule configured to rewrite computer code.

The apparatus described in any of the preceding paragraphs may further comprise logic operative to compute a value based upon coverage and information content for each syntactic abstraction amongst the sets of programming constructs and rank the syntactic abstractions based upon the value of each syntactic abstraction. The apparatus described in any of the preceding paragraphs may further comprise logic operative to identify the syntactic abstraction as a loop idiom based upon a probabilistic language grammar. The apparatus described in any of the preceding paragraphs may further comprise logic operative to generate an abstract syntax tree of the programming constructs as an arrangement of nodes to represent the control structure, remove portions of the abstract syntax tree, replacing other portions of the abstract syntax tree with the semantic information.

Some exemplary embodiments include a computer-implemented method, comprising identifying a programming construct in a code base, generating a syntactic abstraction of the programming construct comprising semantic information associated with a control structure of the programming construct, determining the programming construct comprises idiomatic code based on the semantic information, and modifying the code base to replace the programming construct.

The computer-implemented method described in the preceding paragraph may further comprise determining whether the programming construct comprises the idiomatic code based upon usage patterns and semantic features in the control structure. The computer-implemented method described in any of the preceding paragraphs may further comprise generating a control directive to execute an operator instead of the programming construct when executing the code base.

The computer-implemented method described in any of the preceding paragraphs may further comprise generating the syntactic abstraction of a control structure of which at least one portion is associated with a semantic feature.

The computer-implemented method described in any of the preceding paragraphs may further comprise performing at least one of identifying a new functional operator corresponding to the programming construct, replacing the at least one portion of the code base with at least one functional operator converting an intermediate expression in the programming construct to an object for use in another expression in the programming construct, or identifying a new feature for an application programming interface being used in the programming construct.

The computer-implemented method described in any of the preceding paragraphs may further comprise generating the syntactic abstraction of a control structure of which at least one portion is associated with a semantic feature. The computer-implemented method described in any of the preceding paragraphs may further comprise identifying an operator to replace the programming construct based on semantic similarity. The computer-implemented method described in any of the preceding paragraphs may further comprise comparing the syntactic abstraction to the idiomatic code representations to identify a loop idiom in the programming construct.

The computer-implemented method described in any of the preceding paragraphs may further comprise storing purity information in the syntactic abstraction and identify an operator having matching purity information with the syntactic abstraction.

Some exemplary embodiments include an article of manufacture comprising at least one computer-readable storage medium comprising instructions that, when executed, cause a system to generate a syntactic abstraction for one or more programming constructs to comprise semantic information associated with a control structure for the one or more programming constructs, determine that the syntactic abstraction corresponds to an idiom, and generate information corresponding to modifying the one or more programming constructs.

The article of manufacture described in the preceding paragraph may further comprise instructions to determine that an application programming interface (API) associated with the one or more programming constructs does not include an operator that is configured to perform a functionality of the one or more programming constructs. The article of manufacture described in any of the preceding paragraphs may further comprise instructions to identify at least one new operator configured to perform a functionality of the one or more programming constructs.

The article of manufacture described in any of the preceding paragraphs may further comprise instructions to identify a new feature for the API being used in the programming construct.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:
1. An apparatus, comprising:
a logic circuit; and
logic operative on the logic circuit to identify programming constructs based on a control structure corresponding to performance of a task, generate information to represent the programming constructs, the information comprising a syntactic abstraction to include semantic features of a control structure syntax, and rewrite computer code to perform the task by selection of the syntactic abstraction as an idiom based on coverage and information content amongst a set of idioms.

2. The apparatus of claim 1 comprising logic operative to determine that the syntactic abstraction corresponds to the idiom based upon a probabilistic grammar model.

3. The apparatus of claim 1 comprising logic operative to transform a code base into a modified code base comprising at least one operator configured to perform a functionality of the programming constructs.

4. The apparatus of claim 1 comprising logic operative to generate a rewriting rule to map the syntactic abstraction to an operator or another programming construct.

5. The apparatus of claim 1 comprising logic operative to partition a plurality of programming constructs into sets of programming constructs amongst of which each set of programming constructs corresponds to a control structure syntax, generate a syntactic abstraction to include semantic features of the control structure syntax for each set of programming constructs, rank the sets of the of programming constructs based upon coverage and information content, and select at least one syntactic abstraction for a rule configured to rewrite computer code.

6. The apparatus of claim 5 comprising logic operative to compute a value based upon coverage and information content for each syntactic abstraction amongst the sets of programming constructs and rank the syntactic abstractions based upon the value of each syntactic abstraction.

7. The apparatus of claim 5 comprising logic operative to identify the syntactic abstraction as a loop idiom based upon a probabilistic language grammar.

8. The apparatus of claim 1 comprising logic operative to generate an abstract syntax tree of the programming constructs as an arrangement of nodes to represent the control structure, remove portions of the abstract syntax tree, replacing other portions of the abstract syntax tree with the semantic information.

9. A computer-implemented method, comprising:
identifying a programming construct in a code base;
generating a syntactic abstraction of the programming construct comprising semantic information associated with a control structure corresponding to performance of a task of the programming construct;
determining the programming construct comprises idiomatic code based on the semantic information; and
modifying the code base to replace the programming construct with computer code having semantic similarity to the programming construct based on coverage and information content amongst a set of idioms.

10. The method of claim 9 comprising determining whether the programming construct comprises the idiomatic code based upon usage patterns and semantic features in the control structure.

11. The method of claim 9 comprising generating a control directive to execute an operator instead of the programming construct when executing the code base.

12. The method of claim 9 comprising performing at least one of identify a new operator to replace the programming construct, replace the programming construct with an operator, or convert an intermediate expression in an operator to an object for use in another expression in the operator.

13. The method of claim 9 comprising generating the syntactic abstraction of a control structure of which at least one portion is associated with a semantic feature.

14. The method of claim 9 comprising identifying an operator to replace the programming construct based on semantic similarity.

15. The method of claim 9 comprising storing purity information in the syntactic abstraction and identify an operator having matching purity information with the syntactic abstraction.

16. The method of claim 9 comprising comparing the syntactic abstraction to the idiomatic code representations to identify a loop idiom in the programming construct.

17. An article of manufacture comprising at least one computer-readable storage medium comprising instructions that, when executed, cause a system to:
generate a syntactic abstraction for one or more programming constructs to comprise semantic features of a control structure syntax for the one or more programming constructs wherein the control structure corresponds to performance of a task of the programming constructs;
determine that the syntactic abstraction corresponds to an idiom; and
modifying the one or more programming constructs to include computer code having at least one of the semantic features based on coverage and information content amongst a set of idioms.

18. The article of manufacture of claim 17, comprising instructions that when executed cause the system to:
determine that an application programming interface (API) associated with the one or more programming constructs does not include an operator that is configured to perform a functionality of the one or more programming constructs.

19. The article of manufacture of claim 18, comprising instructions that when executed cause the system to:
identify at least one new operator configured to perform a functionality of the one or more programming constructs.

20. The article of manufacture of claim 18, comprising instructions that when executed cause the system to:
identify a new feature for the API being used in the programming construct.

* * * * *